March 30, 1965      G. FABBRO      3,175,647

SAFETY DEVICE FOR VEHICLE BRAKES

Filed Feb. 26, 1962

INVENTOR.

Giovanni Fabbro

United States Patent Office 3,175,647
Patented Mar. 30, 1965

3,175,647
SAFETY DEVICE FOR VEHICLE BRAKES
Giovanni Fabbro, 8810 7th Ave., St. Michel,
Montreal, Quebec, Canada
Filed Feb. 26, 1962, Ser. No. 175,783
2 Claims. (Cl. 188—106)

This invention relates to a device for improving the reliability of a vehicle, such as an automobile, braking system such as may be required upon malfunction of the service brake.

There are a variety of devices and systems which have been proposed in the past with the idea of improving the performance or reliability of motor vehicle braking systems. One such method employs the use of a mechanical linkage system between the service brake and the manual or hand brake. In this manner, upon failure of the service brake, the manual portion of the system is automatically brought into use.

The advantages to be gained by providing a working system based upon the above principle are numerous, however certain of such prior devices designed with the principle in mind suffer from serious difficulties. One such difficulty is the fact that such prior devices are often difficult to adjust for various conditions of the service brake thus making the operation of the system unreliable.

Another disadvantage with such prior devices is found in the fact that no provision is made for the normal operation of the service brake pedal, upon malfunction of the service system, an important consideration during emergency stops.

It is therefore an object of this invention to provide a safety device for automobile brakes that may be installed between a conventional service brake and a hand brake on an automobile and, while being always operational, will not interfere with the normal operation of the braking system.

It is a further object of this invention to provide a safety device for automobile brakes which will automatically engage the emergency brake upon failure of the service system.

It is a still further object of this invention to provide a safety device for automobile brakes which will act to return the service brake pedal to a normal position upon loss of pedal back pressure due to fluid leakage.

It is yet another object of this invention to provide a safety device for automobile brakes which may have a power assist for returning the service brake pedal.

These and other objects and features of this invention will become apparent when taken in conjunction with the accompanying drawings in which.

Figure 1:
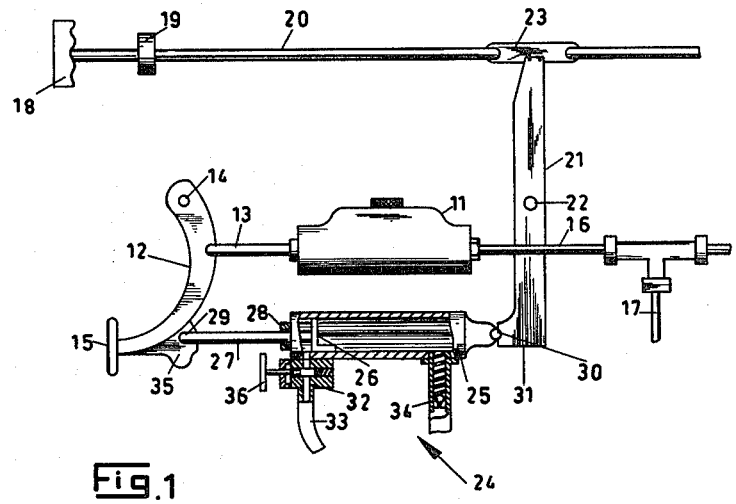
FIG. 1 is an elevation of a portion of a conventional braking system of an automobile showing the device according to the present invention installed thereon.
Figure 2:
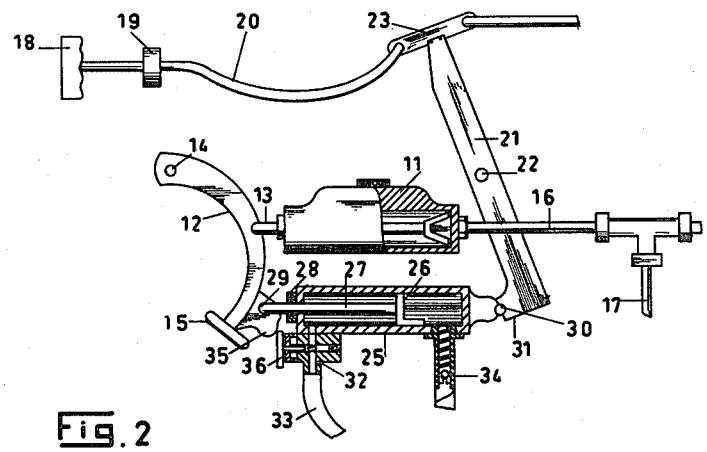
FIG. 2 is an elevation of the system as shown in FIG. 1 and illustrates the action of the various elements during a braking operation.

With reference to FIGS. 1 and 2, a conventional automobile brake system comprises in part a master cylinder 11 being in operable relationship with a brake pedal arm 12 through piston rod 13. Brake pedal arm 12 is pivotally suspended at pin 14 and is movable about this point by applying foot pressure to pedal 15. Hydraulic lines 16 and 17 supply pressurized fluid to the conventional wheel cylinders (not shown).

This then, describes a portion of a conventional hydraulic service brake system with foot pressure on pedal 15 being transmitted through lines 16 and 17, back pressure in the system returning brake pedal arm 12 up to a normal position upon release of foot pressure.

Also illustrated is a portion of a conventional system for an emergency brake comprising handle 18 mounted in guide 19 and having cable 20 secured thereto. Cable 20 is connected to one set of wheels the rear ones usually by mechanical linkages and cables (not shown).

For the purpose of the present invention there is provided a lever 21 being pivoted at 22 and having an upper end 23 connected to brake cable 20.

An actuating assembly indicated generally at 24 comprises cylinder 25 having piston 26 slidable therewithin. A piston rod 27 protrudes from one end of cylinder 25 through seal 28 to end in pivotal contact with brake pedal arm 12 as at 29. The other end of cylinder 25 is releasably engaged in pivot socket 30 located at end 31 of lever 21.

The end of cylinder 25 adjacent pedal arm 12 is in communication through valve 32 with a vacuum line 33, which may be kept under vacuum by connection to the automobile engine intake manifold. The other end of cylinder 25 is provided with a one way valve 34 which while preventing escape of air from within cylinder 25 allows the entry of air therein.

During normal braking procedure the operation of the system and actuating assembly 24 would be as follows. Foot pressure on pedal 15 will actuate master cylinder 11 in the normal manner. Also emergency brake 18 may be pulled, the cable 20 acting on the wheel brakes as previously described. Since lever 21 is free to pivot about pin 22 and out of engagement with cylinder 25 at 30, then actuating assembly 24 is not affected during normal operation.

However, upon failure of the service brake system, brake pedal arm 12 would be displaced an abnormal distance which would force piston 26 along cylinder 25 and compress air therein. Upon sufficient compression taking a braking force would be applied to lever 21 and thus cable 20 at attachment 23. This is turn would apply the rear wheel brakes through the emergency system.

It will be understood that although a certain amount of movement due to compression, will take place at end 31 of lever 21, during normal operation of pedal arm 12, this amount of movement would not set the brakes any harder than the case would be with master cylinder 11. In this way, only complete failure, or at least nearly complete failure would cause assembly 24 to override the service brake.

At any time during release of pedal 15 one-way valve 34 in cylinder 25 will open to allow air to enter the cylinder to equalize the pressure. This valve is necessary since complete re-expansion of the air is not possible due to losses in air leaks and heat of compression.

It will be remembered that upon loss of all braking effect in the service system that back pressure on the brake pedal is also lost. Upon this happening in the present system, projection 35 on brake pedal arm 12 will impinge upon button 36 on valve 32 which will be thus opened. The vacuum line 33 connected to a convenient source will exhaust cylinder 25 and pressure on piston 26 will extend piston rod 27 to return pedal arm 12 to a normal position.

It will be further understood that although one preferred embodiment of the present invention has been disclosed it is also contemplated that certain alterations in design may be resorted to without departing from the spirit of the invention and while still falling within the scope of the following claims.

The embodiments of this invention in which an exclusive property or privilege is claimed are defined as follows:

1. A safety vehicle brake system comprising a hydraulic service brake including a master cylinder, a mechanical emergency brake, a secondary pneumatic cylinder, a piston slidably located within the said pneumatic cylinder, a piston rod connected to said piston, said piston rod passing through a first end of said pneumatic cylinder in sealable slideable contact therewith, a brake pedal for selective operation of said system, a second end of said piston rod being connected to said brake pedal, a substantially centrally pivoted lever having a first end and a second end, said first end of said lever being in releasable engagement with a second end of said pneumatic cylinder, said second end of said lever being in operable relationship with said emergency brake, an emergency brake handle, uni-directional connection means between said emergency brake handle and said emergency brake, said master cylinder and said pneumatic cylinder being interconnected through said pedal to permit said master cylinder to actuate said service brake system during normal conditions without said emergency brake system being actuated, yet to permit said emergency brake system to be actuated upon substantially full depression of said pedal upon failure occuring in said hydraulic service brake; said pneumatic cylinder including a one-way valve near said second end thereof whereby air is prevented from escaping therefrom, thereby providing resistance to the operation of said pedal whereby sudden stoppage of said vehicle is prevented.

2. A safety vehicle brake system as claimed in claim 1 in which said first end of said pneumatic cylinder is supplied with and in communication with a vacuum line, vacuum accumulator means in communication with said vacuum line, hose means connecting said vacuum accumulator means with intake manifold of an engine in said vehicle and a normally closed vacuum valve in said vacuum line to selectively cut off communication between said line and said pneumatic cylinder, said pedal having projecting actuating means, said projecting actuating means biasing said normally closed vacuum valve to an open position upon said pedal being fully depressed, thereby allowing the air in said pneumatic cylinder to be evacuated at said first end of said pneumatic cylinder, whereby said pedal resumes an operable condition.

References Cited by the Examiner
UNITED STATES PATENTS

| | | | |
|---|---|---|---|
| 1,848,414 | 3/32 | Bragg | 188—106 |
| 2,056,942 | 10/36 | Krueger | 188—151.11 |
| 2,098,666 | 11/37 | La Brie | 188—106 |
| 2,648,406 | 8/53 | Roberts | 188—106 |

FOREIGN PATENTS 513,937  10/39  Great Britain.

ARTHUR L. LA POINT, *Primary Examiner.*

A. JOSEPH GOLDBERG, EUGENE G. BOTZ,
*Examiners.*